D. BROOKS.

UNDERGROUND TELEGRAPH LINE.

No. 10,123. Reissued May 30, 1882.

Witnesses
Harry Drury
Harry Smith

Inventor
David Brooks
by his Attorneys
Howson & Son

THE NORRIS PETERS CO., PHOTO-LITHO., WASHINGTON, D. C.

UNITED STATES PATENT OFFICE.

DAVID BROOKS, OF PHILADELPHIA, PENNSYLVANIA.

UNDERGROUND-TELEGRAPH LINE.

SPECIFICATION forming part of Reissued Letters Patent No. 10,123, dated May 30, 1882.

Original No. 254,268, dated February 28, 1882. Application for reissue filed April 20, 1882.

*To all whom it may concern:*

Be it known that I, DAVID BROOKS, a citizen of the United States, and a resident of Philadelphia, Pennsylvania, have invented certain Improvements in Underground-Telegraph Lines, of which the following is a specification.

My invention relates to improvements in the underground-telegraph system for which I obtained Letters Patent of the United States No. 210,986, dated December 17, 1878; and the object of my present invention is to prevent the escape of the insulating-fluid at the terminal stations. This object I attain by forcing paraffine, rosin, or equivalent material, under pressure, around the cotton-covered wires in the pipe near the end of the pipe.

Figure 1:
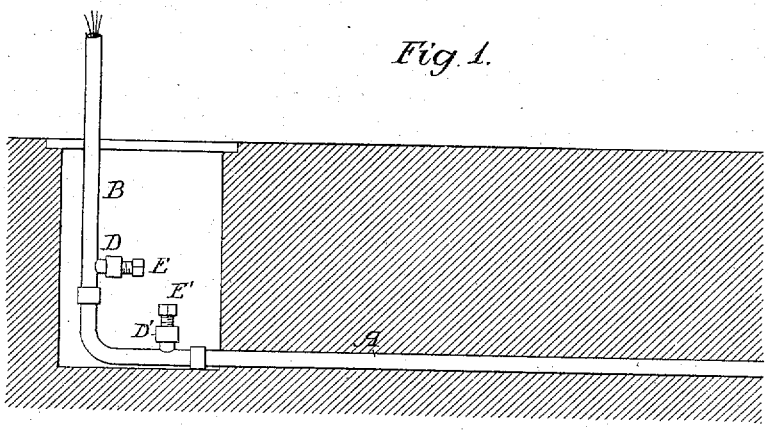
Figure 2:
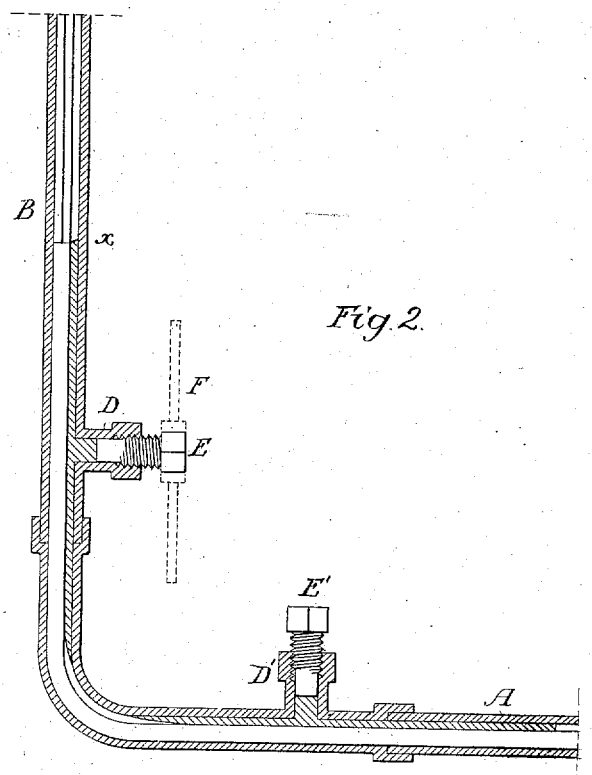

In the accompanying drawings, Figure 1 is a diagram showing a terminal station, and Fig. 2 an enlarged sectional view of a terminal pipe.

A represents the horizontal sections of pipe or tubing containing the usual cable or strand of covered wires to be insulated in oil, and B represents a vertical branch carrying the wires above ground at the terminal station. The wires in the sections of pipe are preferably the usual cotton-covered wires, which, however, do not extend out of the pipe at the terminal station, but at some little distance within the vertical branch B—say at the point *x*—are connected up to corresponding gutta-percha-covered or india-rubber-covered wires extending out of the top of the pipe to the desired points.

In order to prevent the insulating-oil or other fluid which is introduced into the tubing under pressure between the terminals from escaping out of the pipe at the terminal stations, I introduce paraffine, rosin, beeswax, ozocerite, or similar plastic insulating material into each terminal pipe and compress it around the wires, the plastic material preferably extending from a point near where the rubber-covered wires are connected to the cotton-covered wires to a short distance along the horizontal portion of the tubing.

For introducing the paraffine or similar material after the wires are introduced, I provide one or more short branch pipes, D D′, preferably one branch, D, on a vertical portion of the tubing, and another branch, D′, on a horizontal portion of the tubing, near the bend. Each of these branches is internally screw-threaded for the reception of a corresponding screw-plug, E, (E′,) so that after a quantity of paraffine, or similar material has been introduced through the branch it can be forced into the pipe by turning these screw-plugs, and then more of the plastic material introduced and compressed, until it is practically impossible to compress it any further, when all the crevices will have been thoroughly filled up and the pipe effectually plugged, so as to prevent the oil, which is introduced at a point between the terminals, from oozing out at any of the vertical branches B. Each screw-plug E (E′) has a squared head for the application of a key, F, Fig. 2, to get the required pressure.

I claim as my invention—

The mode herein described of preventing the escape of insulating-fluid from the terminal pipes of underground-telegraph lines, the said mode consisting in introducing paraffine or similar material into such terminals, and compressing the same around the wires in the pipe near the end of the said pipe.

In testimony whereof I have signed my name to this specification in the presence of two subscribing witnesses.

DAVID BROOKS.

Witnesses:

HARRY DRURY,

HARRY SMITH.